US007359692B2

(12) United States Patent
Saèd et al.

(10) Patent No.: US 7,359,692 B2
(45) Date of Patent: Apr. 15, 2008

(54) METHOD OF AND DEVICE FOR ANTENNAE DIVERSITY SWITCHING

(75) Inventors: Aryan Saèd, Ottawa (CA); Phil Guillemette, Ottawa (CA)

(73) Assignee: Zarbana Digital Fund, LLC, Wilmington, DE (US)

(*) Notice: Subject to any disclaimer, the term of this patent is extended or adjusted under 35 U.S.C. 154(b) by 355 days.

(21) Appl. No.: 10/610,454

(22) Filed: Jun. 30, 2003

(65) Prior Publication Data
US 2004/0266374 A1 Dec. 30, 2004

(51) Int. Cl.
*H04B 1/06* (2006.01)
*H04B 7/00* (2006.01)

(52) U.S. Cl. .............................. 455/277.1; 455/277.2; 455/226.2; 375/347

(58) Field of Classification Search ................ 455/272, 455/277.1, 277.2, 41.2, 226.1, 226.2, 226.3, 455/275, 286, 290, 339, 307, 254, 266
See application file for complete search history.

(56) References Cited

U.S. PATENT DOCUMENTS

| | | | |
|---|---|---|---|
| 5,203,025 A | | 4/1993 | Anvari et al. |
| 5,446,922 A | * | 8/1995 | Siwiak et al. ............. 455/277.2 |
| 5,490,165 A | * | 2/1996 | Blakeney et al. ........... 370/335 |
| 5,502,747 A | * | 3/1996 | McGrath ..................... 375/350 |
| 5,530,926 A | * | 6/1996 | Rozanski ................... 455/277.2 |
| 5,694,417 A | * | 12/1997 | Andren et al. .............. 375/150 |
| 5,883,921 A | * | 3/1999 | Andren et al. .............. 375/150 |
| 5,960,046 A | * | 9/1999 | Morris et al. ............... 375/347 |
| 6,032,033 A | * | 2/2000 | Morris et al. ............. 455/277.2 |
| 6,085,076 A | | 7/2000 | Lindsay et al. |
| 6,141,392 A | | 10/2000 | Hoshikuki et al. |
| 6,185,435 B1 | * | 2/2001 | Imura ....................... 455/552.1 |
| 6,330,433 B1 | * | 12/2001 | Jager ....................... 455/277.2 |

(Continued)

FOREIGN PATENT DOCUMENTS

EP          0 477 158 A2      3/1992

OTHER PUBLICATIONS

S. Gifford et al, "Synchronization improvements in software defined radios from the use of diversity", Motorola System Solution Group, Proc. of MILCOM 2000, Oct. 2000.*

(Continued)

*Primary Examiner*—Duc M. Nguyen
(74) *Attorney, Agent, or Firm*—Stolowitz Ford Cowger LLP (57) ABSTRACT

The invention relates to the field of wireless communications, more particularly to a method of and device for switching between antennae in communication with a diversity receiver, each of the antennae receiving signals transmitted from a single source. A packet from a transmitter is received by respective antenna communicating with a diversity receiver. The signal strength of the preamble of the packet received in a first antenna is sampled. If the signal strength is of sufficient magnitude to affect reliable reception, the associated antenna is selected for the duration of the packet transmission. If the signal strength is below a predetermined threshold the signal strength of the preamble of the packet received in a second antenna is sampled and compared to the sample associated with the first antenna. If the magnitude of the second sample is greater, the signal associated with the second antenna is selected. To determine the signal strength, the arithmetic average of the signal power over a given period of the preamble is used.

19 Claims, 7 Drawing Sheets

U.S. PATENT DOCUMENTS

| | | | |
|---|---|---|---|
| 6,360,088 B1 | 3/2002 | Shi et al. | |
| 6,483,884 B1 | 11/2002 | Shen et al. | |
| 6,721,550 B1* | 4/2004 | Okada et al. | 455/277.1 |
| 6,778,815 B1* | 8/2004 | Enoki | 455/277.2 |
| 6,847,810 B2* | 1/2005 | Shen et al. | 455/277.2 |
| 2002/0004375 A1* | 1/2002 | Spencer et al. | 455/277.1 |
| 2002/0160734 A1* | 10/2002 | Li et al. | 455/245.1 |
| 2002/0180558 A1* | 12/2002 | Atokawa et al. | 333/132 |
| 2003/0119468 A1* | 6/2003 | Meehan et al. | 455/277.2 |
| 2004/0247046 A1* | 12/2004 | Hsiao | 375/319 |
| 2006/0009177 A1* | 1/2006 | Persico et al. | 455/143 |

OTHER PUBLICATIONS

Amin Salkhi et al; Techniques to Enhance Wireless Local Area Network (WLAN) Performance; Dec. 1, 2002, pp. 1-12 (12a,b,c).

Chun-Ning Zhang et al; a Low-Complexity Antenna Diversity Receiver Suitable for TDMA Handset Implementation; 1997; pp. 1753-1757, IEEE.

* cited by examiner

METHOD OF AND DEVICE FOR ANTENNAE DIVERSITY SWITCHING

BACKGROUND OF THE INVENTION

1. Field of the Invention

The invention relates to the field of wireless communications, more particularly to a method of and device for switching between antennae communicating with a diversity receiver, each of the antennae receiving signals transmitted from a single source.

2. Description of the Related Prior Art

As will be appreciated by those skilled in the art, within a wireless communication system, maintaining sufficient signal strength to provide for continuous communication between parties is critical. A common problem in wireless communications is interference caused by nearby transmissions on the same or adjacent frequency bands. Interference can cause a receiver to misinterpret a transmitted signal, become jammed, fail to correlate a received signal, or can have other adverse effects on the ability of a receiver to properly receive transmitted information. In addition, receivers in a wireless communication system can also suffer from multipath and fading, which can cause the received signal to fluctuate in amplitude, phase or other characteristics in a relatively short period of time.

Figure 1:
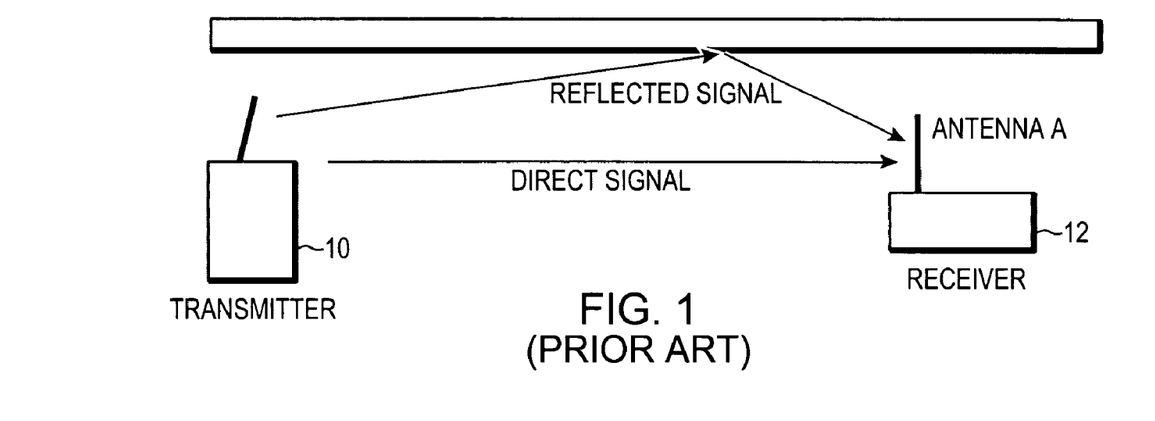
FIG. 1 depicts a typical wireless system in which a multipath null is produced.

Avoiding "dropouts" or "nulls" caused by multipath phase cancellations has been the focus of much attention in the wireless industry. Dropouts occur when the transmitter and receiver antennas are in a particular location relative to one another. As shown in FIG. 1, the signal from the transmitter 10 reaches antenna A of receiver 12 via a direct path and a reflected path. The reflected signal path is a bit longer than the direct path, causing the two signals to be put out of phase when they mix together at the receiver antenna A. The resulting weak signal causes a dropout. Moving the transmitter 10 or receiver 12 to a different location may reduce or eliminate dropouts. However, sometimes relocating these devices is not practical or possible. As a result antenna diversity techniques were developed to overcome dropouts.

Figure 2:
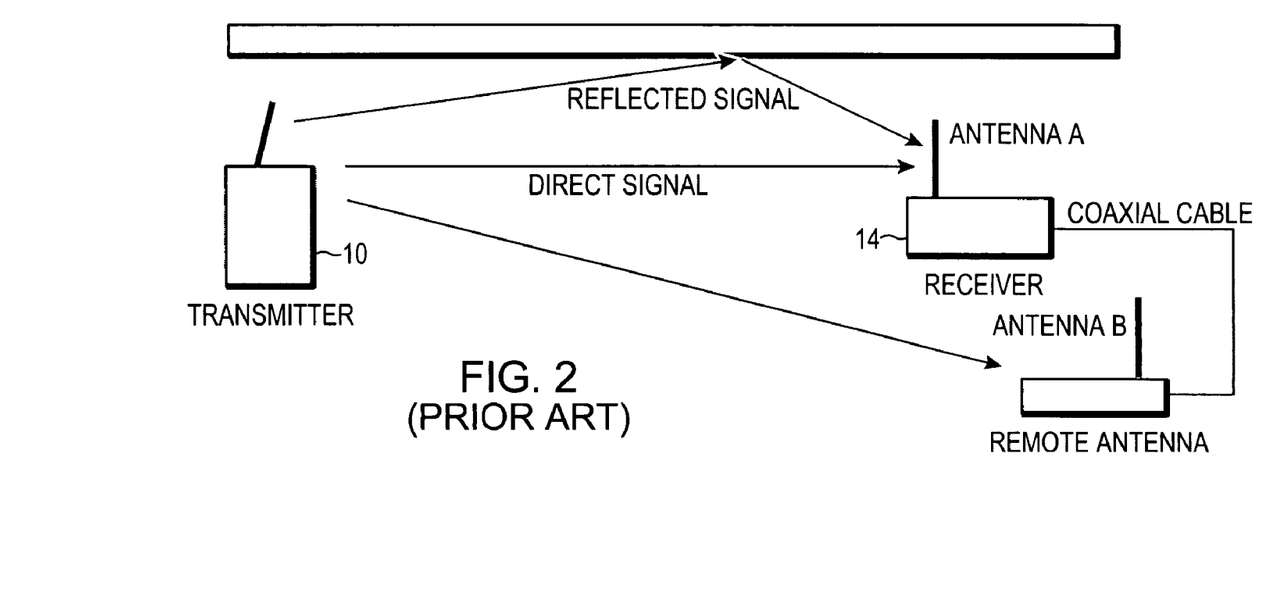
FIG. 2 depicts a typical wireless system incorporating diversity reception.

The basic concept of antenna diversity is depicted in FIG. 2. As shown in the figure, two antennas A and B are used. The signal arriving from transmitter 10 at antenna A is largely cancelled by a multipath null, leaving little signal left for the diversity receiver 14. However, the signal at antenna B remains strong and provides adequate signal for the receiver 12 to produce a usable audio signal to noise ratio. Generally speaking, the spacing between antennas A and B must be at least ½ wavelength of the operating frequency to ensure that antennas A and B are receiving uncorrelated (i.e. "Diverse") signals to gain the full benefit of diversity reception.

As shown in FIG. 2, the signals received from antennas A and B are processed in a diversity receiver 14. Diversity circuitry implemented in a high quality receiver with excellent sensitivity will reduce or eliminate multipath dropouts and, in some cases, increase operating range. The improvement in reception will vary depending upon the diversity methodology chosen by the designer. The type of diversity reception circuitry chosen in the receiver design includes a number of considerations, including cost, size and weight, performance and the practicality of each circuit type for a given application. The manner in which incoming signals from two different antennas are handled after they enter the receiver is what makes the difference between a highly efficient and a less efficient receiver. Using diversity reception makes little sense unless the receiver is a high quality design to begin with.

Figure 3A:
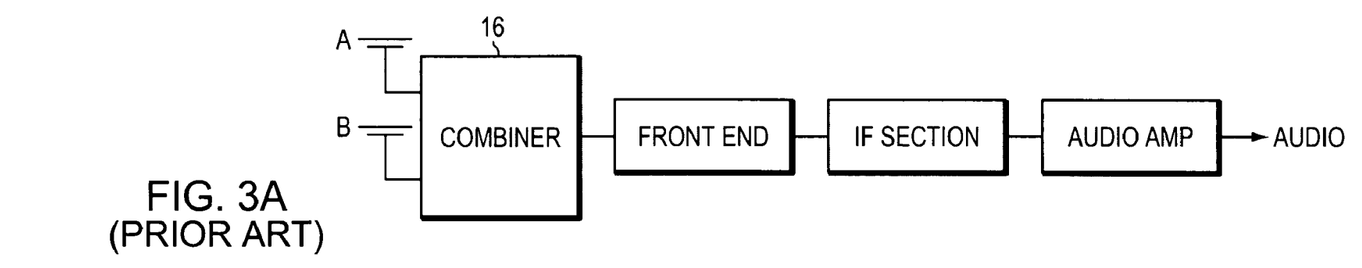
FIG. 3A depicts a block diagram of a passive diversity receiver.

It will be also understood by those in the art that there are several different techniques used for diversity reception in various designs with varying degrees of success. These techniques can be broadly divided into two groups: non-active; and active. As shown in FIG. 3A, passive diversity is a non-active technique which involves the addition of a second antenna to a single receiver, placed ½ wavelength or more away. The antennas A and B are connected to a combiner 16 which adds the two signals. However, when the received signals are out of phase with one another dropouts will occur.

Figure 3B:
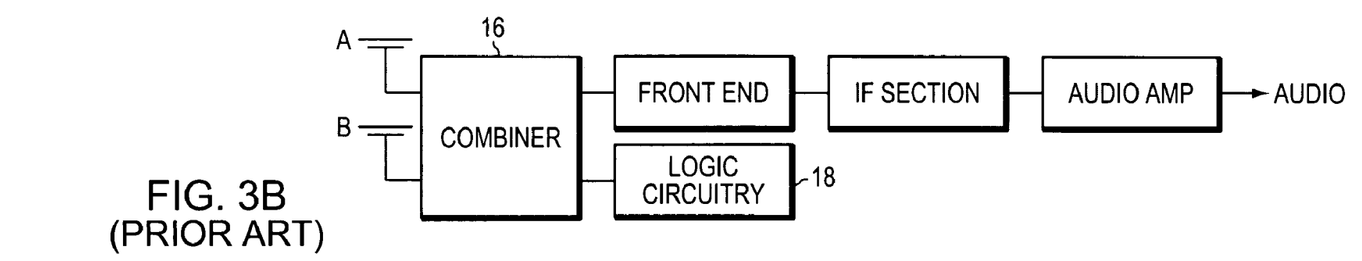
FIG. 3B depicts a block diagram of an antenna phase switching diversity receiver.

As shown in FIG. 3B, active diversity reception techniques include: antenna phase switching diversity; audio switching diversity; and ratio diversity. With antenna phase switching diversity, two antennas A and B are mixed to feed a single combiner 16, with a phase reversal switch (not shown) added to the input of one of the antennae. When signal conditions deteriorate, the phase of one of the antennas is reversed and logic circuitry 18 then determines whether or not the switching action has improved the signal to noise ratio, and decides whether to latch in that position or switch and sample again. The problem with this solution is that the receiver doesn't react until it is already in trouble. Further, there is always the possibility that switching phase will make a marginal problem worse. Finally, since the switching circuitry is in the RF signal path and is triggered only at RF levels, it can produce a "click" when the switching occurs.

Figure 3C:
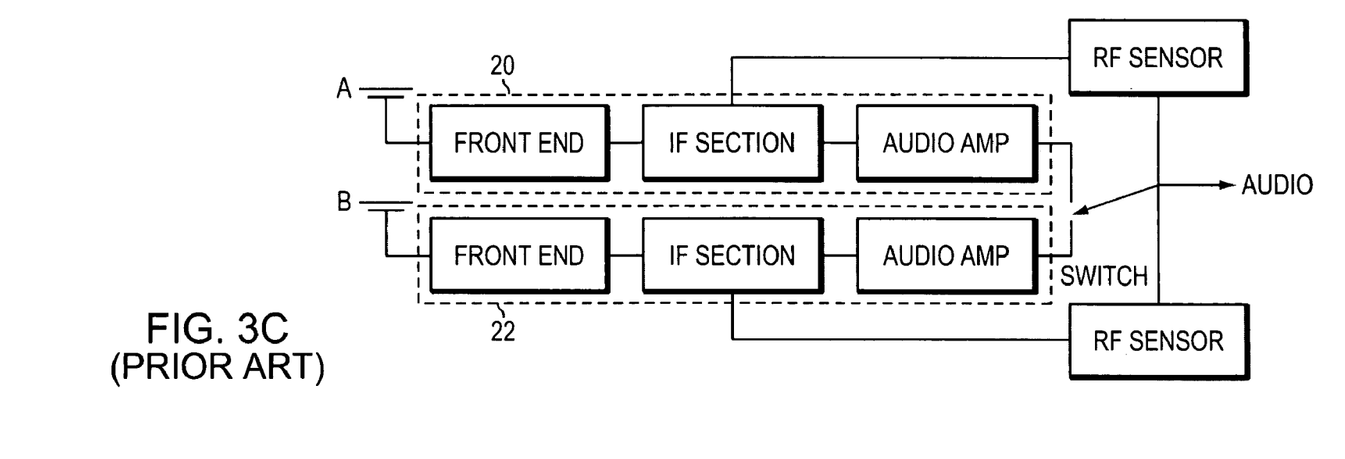
FIG. 3C depicts a block diagram of an audio switching diversity receiver.

As shown in FIG. 3C, audio switching diversity uses two receivers 20, 22, selecting the audio output of one of the receivers. The switching action is usually triggered by comparing incoming RF levels and switching to the receiver with the stronger RF signal, which usually produces a better signal to noise ratio in multipath conditions. The downside of this solution is that two receivers are required, meaning that the physical size and power requirements will be greater. In order to implement this solution in a compact, battery powered receiver, serious compromises must be made in the circuit design to reduce the physical size and power requirements.

Figure 3D:
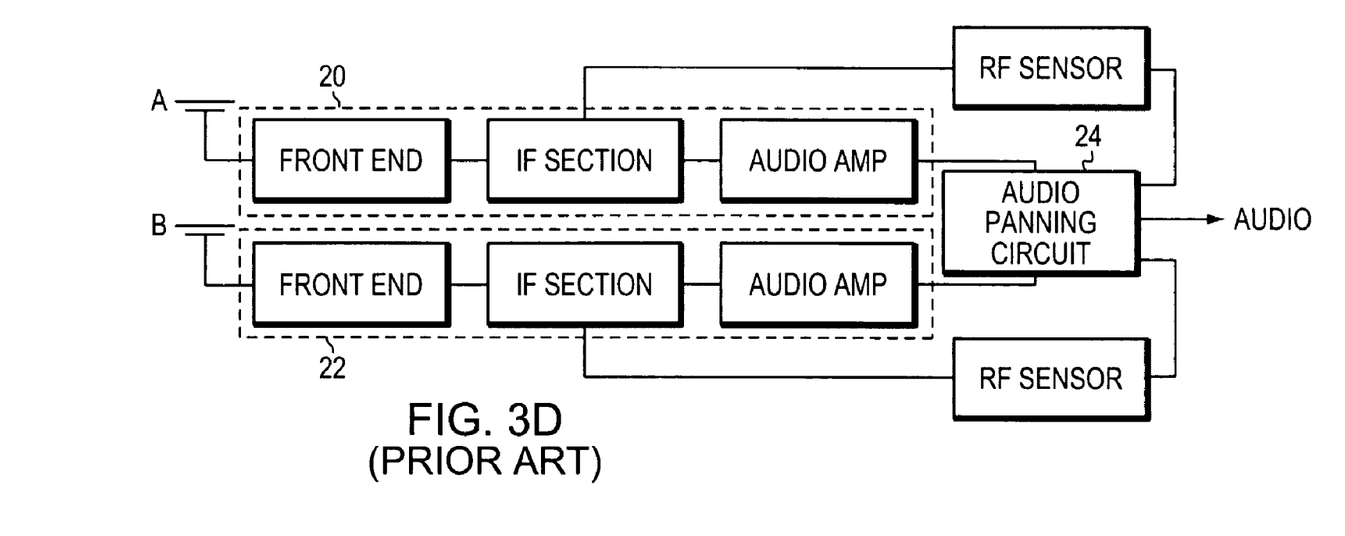
FIG. 3D depicts a block diagram of a ratio diversity receiver.

Finally, As shown in FIG. 3D ratio diversity utilizes two separate receivers 20, 22, sharing a common oscillator and audio circuitry. The audio inputs of the receivers are used simultaneously, being mixed by a "panning" circuit 24 in a ratio controlled by the comparative RF levels at the receivers 20, 22. This method anticipates dropouts long before they occur, since the comparative RF level sampling and mixing starts taking place at higher RF signal levels than in other diversity designs. By the time the signal level at one receiver drops low enough to produce noise, the panning circuitry 24 has long since shifted to the other receiver. Unlike audio switching diversity, a ratio diversity receiver utilizes both receivers simultaneously. When the overall signal is low and the receiver is struggling to find enough signal to produce a useable signal to noise ratio, the ratio diversity receiver will continue to balance the outputs of the two receivers for the lowest noise, even at very low RF levels. Unfortunately, like the audio switching diversity arrangement, two receivers are required, resulting in the same disadvantages.

As will also be appreciated by those in the art, diversity receivers select the antenna to be used for each individual burst based on a metric that is measured during the beginning of each received burst or packet. Generally speaking, quick, precise measurement on a per packet basis is desirable to ensure that the best possible signal is being processed. Fast diversity decisions require a low latency filter, but such a filter may not reject noise and interference very well. This is a tradeoff decision impacting the performance of the diversity algorithm. Allowing for high latency enables the design of a filter that has better noise to interference rejection which is beneficial during data transmission after the header where latency is less of a concern.

The metric upon which the antenna selection is based can either be a signal quality index or a signal power index. Signal quality indices will often use a matched filter to generate the decision metric. However, the timing budget may not allow for a reliable signal quality index to be generated for all antennae. The signal power index is a preferred alternative since it takes less time to measure. However, the use of the signal power index in has not been efficiently incorporated into a diversity selection receiver to date.

In light of the problems and deficiencies highlighted above, there is a need, therefore, for an improved diversity receiver capable of effectively preventing a deterioration in transmission efficiency.

SUMMARY OF THE INVENTION

The invention provides a device for and method of enhancing antennae diversity switching within a wireless communication system. A packet from a transmitter is received by respective antenna communicating with a diversity receiver. The signal strength of the preamble of the packet received in a first antenna is sampled. If the signal strength is of sufficient magnitude to affect reliable reception, the associated antenna is selected for the duration of the packet transmission. If the signal strength is below a predetermined threshold the signal strength of the preamble of the packet received in a second antenna is sampled and compared to the sample associated with the first antenna. If the magnitude of the second sample is greater, the signal associated with the second antenna is selected. To determine the signal strength, the arithmetic average of the signal power over a given period of the preamble is used.

In accordance with one aspect of the invention there is provided in a wireless communication system, a method of selecting an antenna from at least two antennae on a per packet basis, the method comprising: receiving, at each of said at least two antennae communicating with a diversity receiver, a data packet transmitted over a wireless communication link, said data packet comprising at least a preamble and said preamble having a signal strength associated therewith; determining said data packet preamble signal strength associated with a first antenna; and selecting said first antenna if the determined signal strength exceeds a predetermined threshold.

In accordance with another aspect of the invention there is provided a diversity receiver in a wireless network for selecting between one of at least two antennae on a per packet basis, said diversity receiver comprising: at least two antennae; and a diversity select circuit communicating with said at least two antennae, wherein said diversity select circuit selects between one of said at least two antennae based on a metric associated with a preamble of a packet received over a wireless communication link.

The advantages of the present invention are readily apparent. The invention allows the benefit of per packet antenna diversity selection within a tighter timing budget. A tighter timing budget allows more of the preamble to be used for other processing once the preferred antenna has been selected, without storing parts of the packet to combat latency. Ultimately more efficient transmission of packets is achieved.

BRIEF DESCRIPTION OF THE DRAWINGS

A better understanding of the invention will be obtained by considering the detailed description below, with reference to the following drawings in which.

DETAILED DESCRIPTION OF THE PREFERRED EMBODIMENT

In essence, the invention describes a technique for selecting between two receiver antennae in a wireless communications system utilizing a single receiver. As will be explained below, the invention provides for the sampling of the signal strength during receipt of the preamble of a packet, and making an antenna selection based on the determined signal strength.

Figure 4:
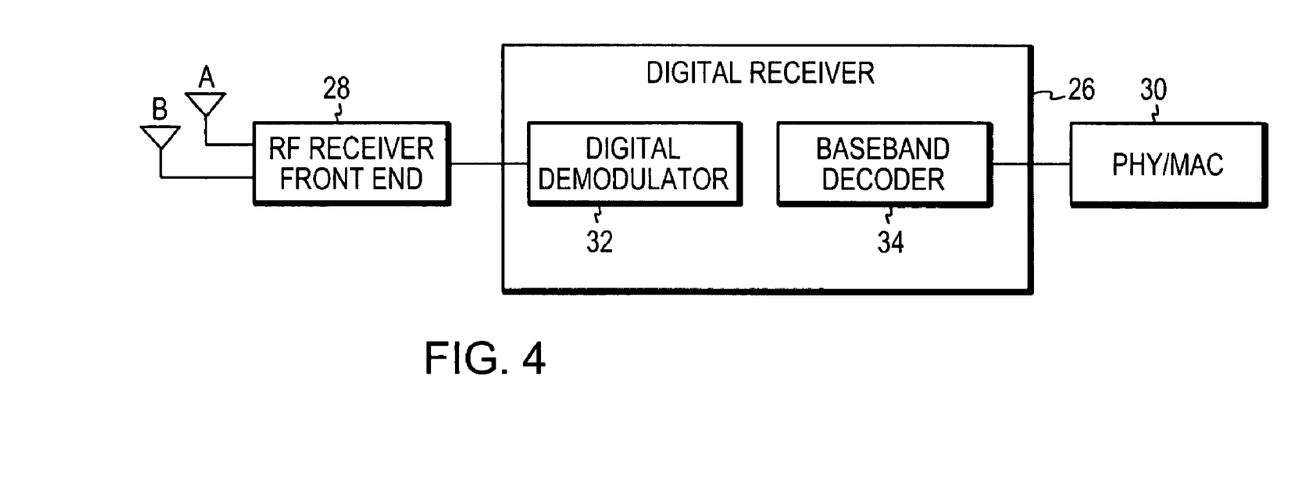
FIG. 4 depicts a block diagram of a diversity receiver in accordance with the present invention.

Referring to FIG. 4, there is depicted a diversity receiver 26 in which the present invention is housed. The preferred receiver may be, for example, the ICE5350 Digital Receiver offered by IceFyre Semiconductor Inc. but the invention is not meant to be limited to this receiver. The diversity receiver is located between the RF Receiver Front End 28 and the Physical Medium Access Control (PHY/MAC) 30. The RF Receiver Front End connects to antennae A and B. As shown in the drawing, the two main blocks within the diversity receiver 26 are the digital demodulator 32 and the baseband decoder 34. The digital demodulator 32 recovers the baseband signal by removing carrier offsets, timing offsets, compensating for the channel impairments and demapping the digitally modulated signal. This block is located between the analog-to-digital interface (not shown) and the baseband interface (not shown). The baseband decoder 34 de-interleaves the baseband signal, provides error correction through the soft-decision Viterbi algorithm and unscrambles the corrected bit stream to be passed through the PHY/MAC 32. This block is located between the baseband interface (not shown) and the PHY/MAC interface (not shown).

Figure 5:
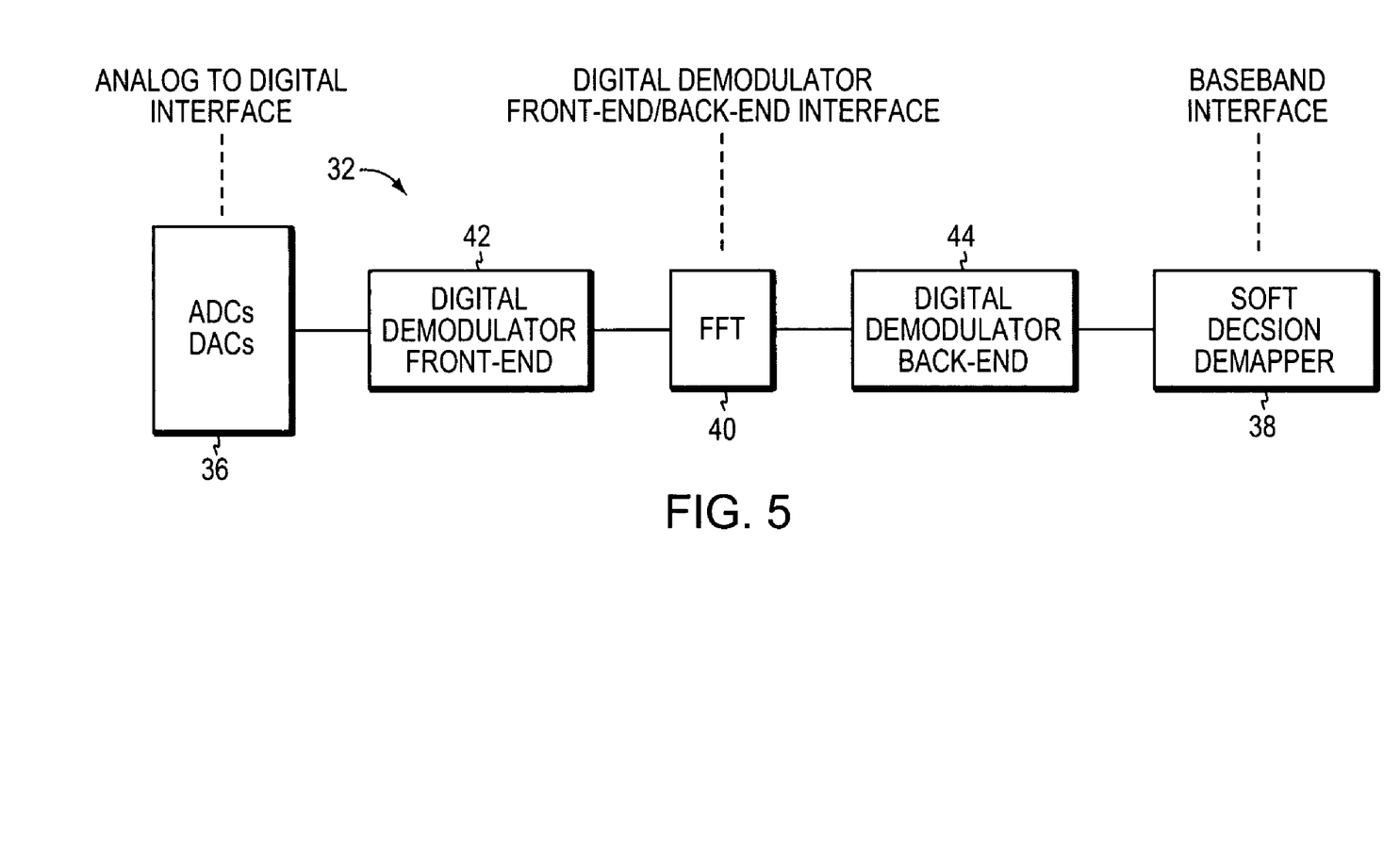
FIG. 5 depicts a block diagram of a digital demodulator integral to the diversity receiver of FIG. 4.

FIG. 5 depicts the digital demodulator 32 of FIG. 4. As shown in the diagram, the analog to digital interface is located at block ADCs/DACs 36. The baseband interface can also be seen in the figure at the soft decision demapper 38. It can also be seen in the figure that the digital demodulator 32 is distinctly divided into two parts by the Fast Fourier Transform (FFT) circuit 40. To the left is the digital demodulator front-end (DFE) 42, while to the right is the digital demodulator back-end (DBE) 44. The invention of the present invention is provided in the digital demodulator front-end 42.

Figure 6:
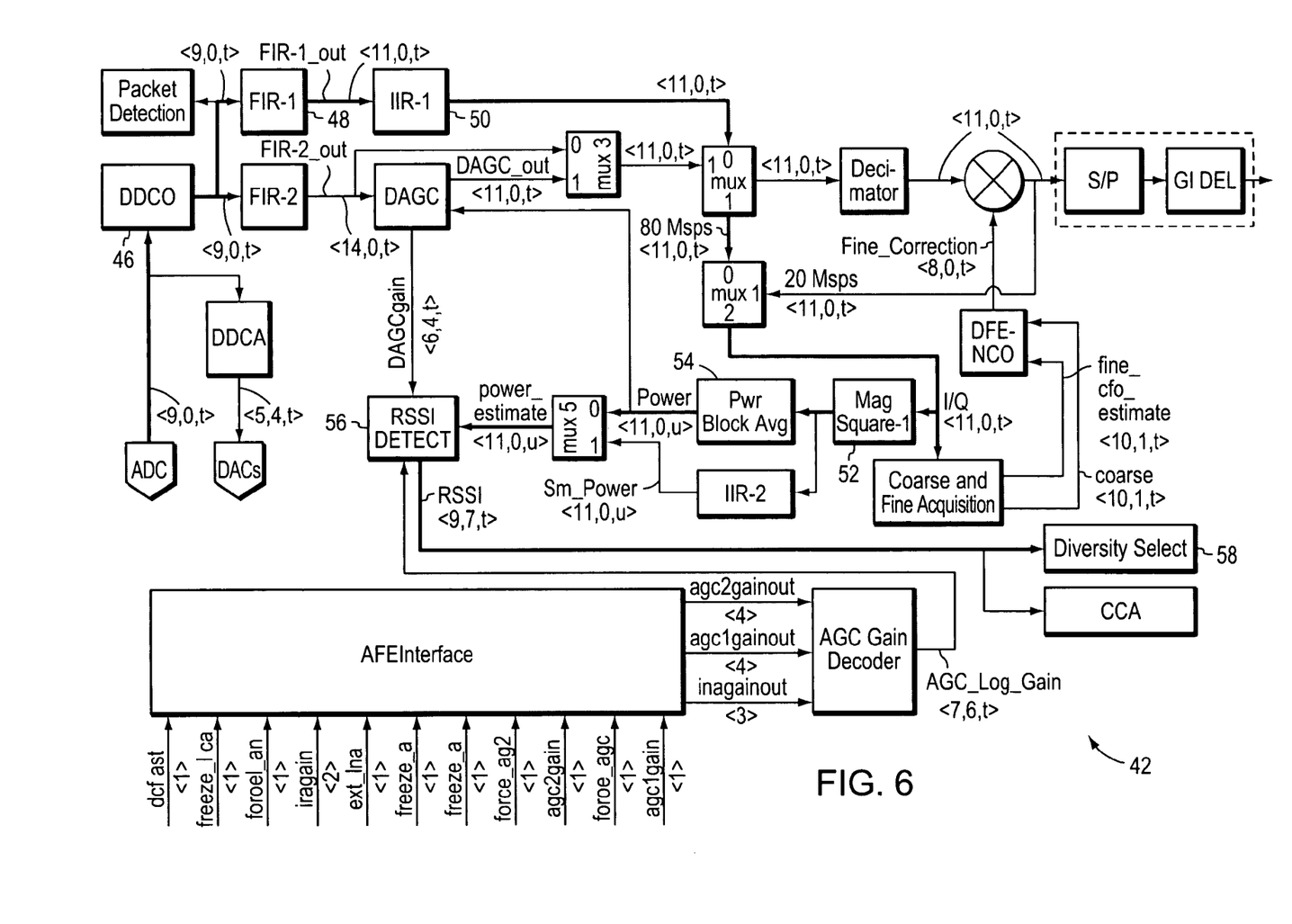
FIG. 6 depicts a block diagram of a digital demodulator front end integral to the digital demodulator of FIG. 5.
Figure 8:
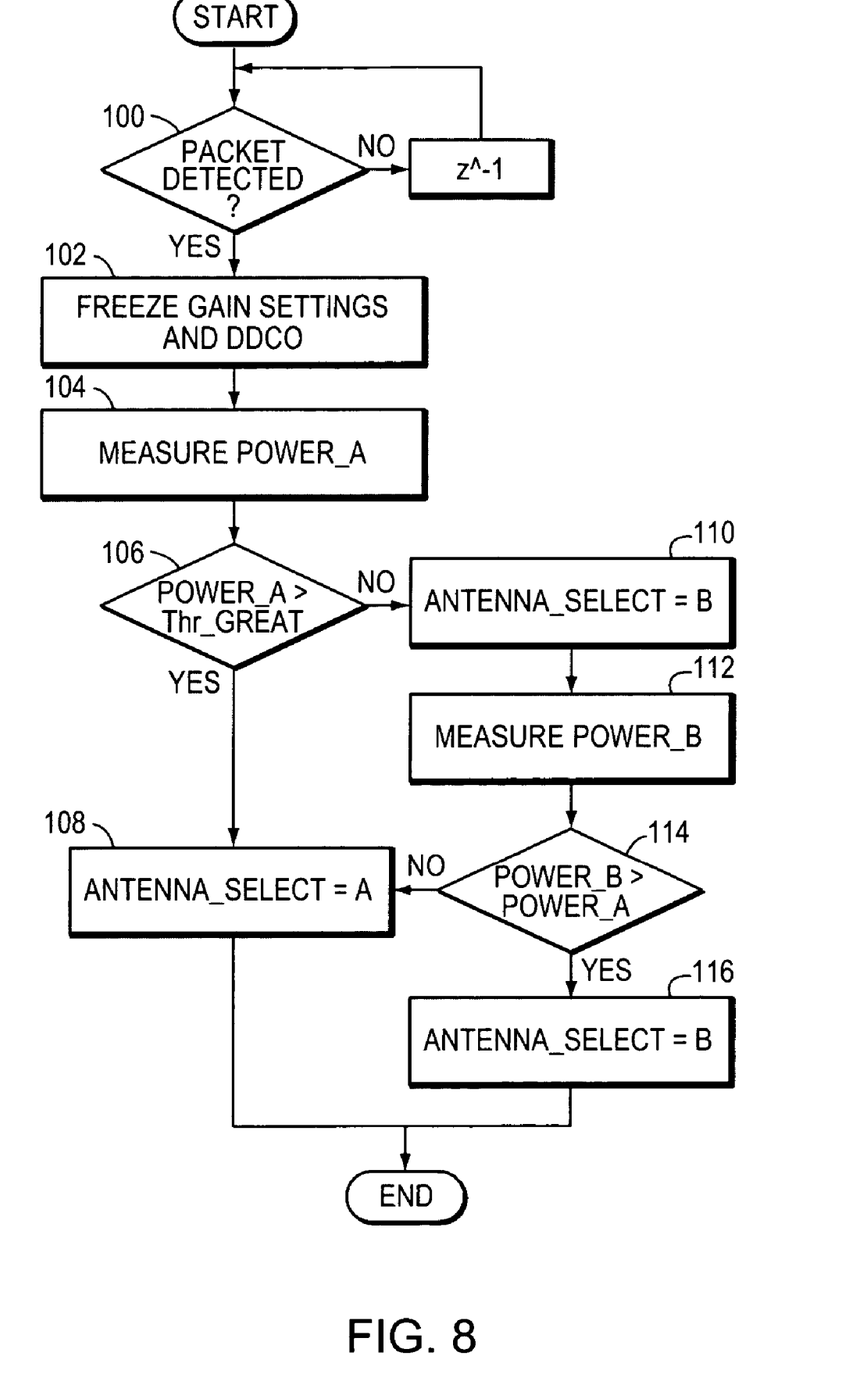
FIG. 8 depicts a diversity select operational flowchart in accordance with the present invention.

FIG. 6 depicts the digital demodulator front-end 42 of FIG. 5. The blocks and 'wires' that are in bold are those that are in use during the diversity selection process and are defined as follows:

(a) The Digital Direct Current Compensation (DDCO) block 46. As will be explained below in relation to FIG. 8, the gain and DDCO remain static throughout the entire diversity selection process;
(b) Finite Impulse Response (FIR-1) block 48 and Infinite Impulse Response (IIR-1) block 50 are fast digital filters used to band-limit the signal without trying to maintain linear phase;
(c) The Mag(nitude) Square-1 block 52 computes the absolute square of each complex sample;
(d) The Pwr Block Avg 54 computes the arithmetic average of a given number of samples;
(e) The Receive Signal Strength Estimate (RSSI) Detect block 56 converts the average into a dB value; and
(f) The Diversity Select block 58 compares the value from antenna A to that of antenna B.

It will be understood by those skilled in the art that the conversion to db of the arithmetic average is not necessary and can be removed to decrease the latency.

Figure 7:
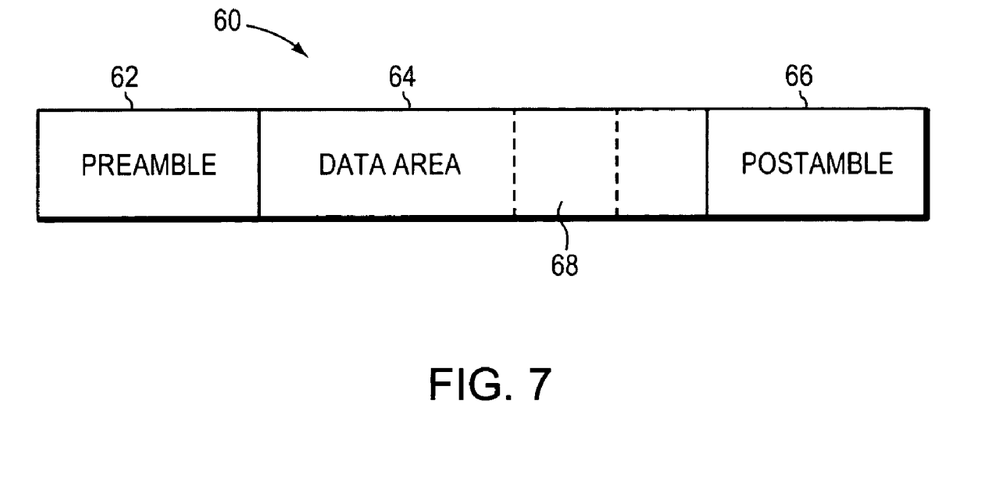
FIG. 7 depicts a typical packet used in the wireless transmission system of the present invention.

FIG. 7 depicts a typical packet generated in a packet generation circuit of a transmitter communicating with diversity receiver 26. As shown in the figure, each of the packets 60 comprise a preamble section 62, a data section 64 and an (optional) postamble section 66. The preamble section 62 is used for, among other things, synchronization which allows the receiver to perform such functions as clock recovery, automatic gain control, signal-to-noise ratio estimation and diversity selection which is the focus of the present invention. The preamble may also contain a start of frame delimiter, and a data rate field indicating the data rate which will be used for the reception of the data section 64. The postamble section 66 generally contains an end of frame delimiter and optionally an error detection code such as, for example, a cyclical redundancy check (CRC) code. It will also be understood by those in the art that a packet may contain an additional "midamble" section, which is sometimes placed in the middle of a very large packet. It basically contains some preamble-like information to assist in timing and frequency tracking/reacquisition. It may be possible to use the "midamble" for an additional diversity selection in mid packet and this is meant to be included within the scope of the invention The diversity select circuit integral to the invention will now be described in relation to FIG. 8. The diversity select circuit is set to default to antenna A (see FIG. 4). A transmitted packet is received by antennae A and B of the diversity receiver 26. At step 100, a packet detection circuit (not shown) in the digital demodulator front-end 42 determines that a packet, in the form of a signal on a carrier wave, has been detected by the current antenna (i.e. the default antenna A). If a packet is not detected, the circuit returns to an idle state and awaits the receipt of a future signal. If a packet is detected, at step 102, the gain and DDCO settings are frozen to ensure that the circuit has common state settings for the power/RSSI measurement of antennae A (and subsequently antenna B if required). The power/RSSI of the antenna A signal is then measured (at step 104) during a first sample time. At step 106, the power/RSSI measurement is then compared with Thr_Great, a user selected threshold to determine if the signal strength of the detected packet is of sufficient strength to be processed. At step 108, if the power/RSSI measurement associated with antenna A is greater than Thr_Great, the diversity circuit signals that a packet of sufficient signal strength has been detected, and Antenna A is selected for the duration of the packet receipt. At step 110, if instead the antenna A power/RSSI measurement is less than Thru_Great, antenna B is selected and at step 112 a power/RSSI measurement is taken. At step 114, the antenna B measurement is compared with the measurement from antenna A. If the antenna B measurement is greater than the antenna A measurement, circuit selects antenna B (step 116). If the antenna B measurement is not greater than the antenna A measurement then the circuit defaults to antenna A. Where antenna B has been selected, after the packet has been received, the circuit switches back to the default antenna A.

With respect to the power/RSSI measurement, the arithmetic average of the received signal power over a given period of the preamble of each antenna is calculated at the Pwr Block Avg 54 shown in FIG. 6. The period is selected such that for an ideal signal the average power will be time-independent i.e. if the average starts on sample n, it will equal the same as if the average started on sample m, where n and m are not equal. At the same time, the period is selected such that there is sufficient noise suppression i.e. the variance of the average on a noisy signal is reduced. As highlighted in FIG. 6, the signal is examined after fast (i.e. low latency) Finite Impulse Response (FIR) and Infinite Impulse Response (IIR) filters, thus avoiding the high latency Rx Digital Finite Impulse Response (FIR) filter and thereby allowing for fast processing latency. This maximizes the actual measurement time while probing each antenna during the preamble. It should also be noted that due to symmetries in the preamble information and its periodicity, that the averaging interval required to make the averaging process time-independent can typically be made to be shorter than the interval required for a signal quality index using a cross correlation (i.e. matched filtering).

The present invention may be implemented as a combination of both hardware and software. In particular, the present invention can be implemented as a series of computer readable instructions stored in a microprocessor—a digital signal processor (DSP) ideally suited to the numerically-intensive requirements of diversity selection. The computer readable instructions may be programed in a procedural programming language (e.g. "C") or an object oriented language (e.g. "C++"). The series of computer instructions embody all or part of the functionality previously described herein.

Embodiments of the present invention may also be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented entirely as hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

A person understanding this invention may now conceive of alternative structures and embodiments or variations of the above all of which are intended to fall within the scope of the invention as defined in the claims that follow.

We claim:

1. In a wireless communication system, a method of selecting an antenna from at least two antennae on a per packet basis, the method comprising:
   receiving, at each of said at least two antennae communicating with a diversity receiver, a data packet transmitted over a wireless communication link, said data packet comprising at least a preamble having a signal strength;
   determining said data packet preamble signal strength associated with a first antenna and
   selecting said first antenna if the determined signal strength exceeds a predetermined threshold;
   where the determining occurs after processing by a low latency filter;
   where the determining occurs before processing by a high latency filter; and
   where the high latency filter is used to process the remainder of said received data packet.

2. The method of claim 1 further comprising:
   determining said data packet preamble signal strength associated with a second antenna;
   comparing said data packet preamble signal strength associated with said second antenna with said data packet preamble signal strength associated with said first antenna responsive to the determining said data packet preamble signal strength associated with the second antenna; and
   selecting said second antenna if said data packet preamble signal strength associated with said second antenna is greater than said data packet preamble signal strength associated with said first antenna.

3. The method of claim 1 where said determining comprises calculating the arithmetic average of said signal strength over a user defined period of said data packet preamble.

4. The method of claim 3 where said user defined period is selected such that the calculated average signal strength is time-independent.

5. The method of claim 1 further comprising selecting one of said at least two antennae based on a signal strength measurement of a midamble associated with said received data packet.

6. The method of claim 1 where a digital direct current component and a gain component remain static during said determining.

7. A diversity receiver in a wireless network for selecting one of at least two antennae on a per packet basis, said diversity receiver comprising:
   at least two antennae; and
   a diversity select circuit capable of communicating with said at least two antennae;
   where said diversity select circuit is capable of selecting one of said at least two antennae based on a metric associated with a preamble of a packet received over a wireless communication link;
   where said diversity select circuit further comprises a low latency filter;
   where the metric associated with said preamble is examined after processing by said low latency filter;
   where said preamble is examined before processing by a high latency filter; and where said high latency filter used to process the remainder of said received data packet.

8. The diversity receiver of claim 7 where said metric is a signal strength associated with said received packet preamble.

9. The diversity receiver of claim 7 where said diversity select circuit comprises:
   a power averaging component capable of calculating the average signal strength over a defined period of time of a preamble of said received packet;
   an RSSI detect component capable of converting said average into a dB value; and
   a diversity select component capable of determining if said average signal strength exceeds a user defined signal strength threshold and selecting one of said at least two antennae based on the results of said determination.

10. The diversity receiver of claim 7 where said diversity select circuit selects between one of said at least two antennae based on a metric associated with a midamble of said received packet.

11. The diversity receiver if claim 7 where said diversity select circuit further comprises a digital direct current compensation component and a gain component, and where said components remain static during the operation of said diversity select component.

12. The diversity receiver of claim 7 where the diversity receiver includes the high latency filter.

13. A diversity receiver in a wireless network for selecting one of at least two antennae on a per packet basis, said diversity receiver comprising:
   means for receiving a wireless transmission; and
   means for selecting one of said at least two antennae based on a metric associated with a preamble of a packet received over said wireless transmission;
   where said selecting means comprises a low latency means, for filtering; and
   where the metric associated with said preamble is examined after processing by said low latency filtering means;
   where the metric associated with said preamble is examined before processing by a high latency filtering means.

14. In a wireless communication system, a method of selecting an antenna from at least two antennae on a per packet basis, the method comprising:
   receiving, at each of said at least two antennae communicating with a diversity receiver, a data packet transmitted over a wireless communication link, said data packet comprising at least a preamble having a signal strength associated therewith;

determining said data packet preamble signal strength associated with a first antenna; and selecting said first antenna if the determined signal strength exceeds a predetermined threshold;

where the determining occurs after processing by a low latency filter; and where the determining occurs before processing by a high latency filter.

15. The method of claim 14 comprising:

comparing a data packet preamble signal strength associated with a second antenna with said data packet preamble signal strength associated with said first antenna; and selecting said second antenna if said data packet preamble signal strength associated with said second antenna is greater than said data packet preamble signal strength associated with said first antenna.

16. The method of claim 14 comprising:

calculating the arithmetic average of said signal strength associated with the first and second antenna over a user defined period of said data packet preamble.

17. The method of claim 16 comprising:

selecting the user defined period of said data packet preamble such that the calculated average signal strength is time-independent.

18. The method of claim 14 comprising:

selecting one of said at least two antennae based on a signal strength measurement of a midamble associated with said received data packet.

19. The method of claim 14 comprising:

keeping static a digital direct current component and a gain component during said determining.

* * * * *

UNITED STATES PATENT AND TRADEMARK OFFICE
CERTIFICATE OF CORRECTION

PATENT NO. : 7,359,692 B2
APPLICATION NO. : 10/610454
DATED : April 15, 2008
INVENTOR(S) : Saed et al.

It is certified that error appears in the above-identified patent and that said Letters Patent is hereby corrected as shown below:

At column 7, line 32, please replace "antenna and" with --antenna; and--.
At column 8, line 35, please replace "selects between one" with --selects one--.

Signed and Sealed this

Eighteenth Day of May, 2010

David J. Kappos
*Director of the United States Patent and Trademark Office*